(12) United States Patent
Miller

(10) Patent No.: US 10,529,107 B1
(45) Date of Patent: Jan. 7, 2020

(54) PROJECTOR ALIGNMENT IN A CONTACT LENS

(71) Applicant: Spy Eye, LLC, Palo Alto, CA (US)

(72) Inventor: Gregory David Miller, San Jose, CA (US)

(73) Assignee: Tectus Corporation, Saratoga, CA (US)

(*) Notice: Subject to any disclaimer, the term of this patent is extended or adjusted under 35 U.S.C. 154(b) by 0 days.

(21) Appl. No.: 16/127,479

(22) Filed: Sep. 11, 2018

(51) Int. Cl.
| | |
|---|---|
| G06T 7/70 | (2017.01) |
| H04N 13/344 | (2018.01) |
| H04N 13/332 | (2018.01) |
| G06T 11/60 | (2006.01) |
| G06T 3/00 | (2006.01) |
| G02C 7/04 | (2006.01) |
| G06F 3/01 | (2006.01) |
| G06F 3/16 | (2006.01) |

(52) U.S. Cl.
CPC ............... *G06T 11/60* (2013.01); *G02C 7/04* (2013.01); *G06T 3/0068* (2013.01); *G06F 3/013* (2013.01); *G06F 3/017* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 4,871,247 A | 10/1989 | Haynes | |
| 5,331,149 A | 7/1994 | Spitzer | |
| 5,467,104 A | 11/1995 | Furness, III | |
| 5,638,218 A | 6/1997 | Oomura | |
| 5,638,219 A | 6/1997 | Medina Puerta | |

(Continued)

FOREIGN PATENT DOCUMENTS

| | | |
|---|---|---|
| CA | 2280022 A1 | 1/2001 |
| WO | 2016014118 A1 | 1/2016 |

(Continued)

OTHER PUBLICATIONS

Kao, H-L. et al., "DuoSkin: Rapidly Prototyping On-Skin User Interfaces Using Skin-Friendly Materials," ISWC '16, ACM, Sep. 12-16, 2016, 8 pages.

(Continued)

*Primary Examiner* — Martin Mushambo
(74) *Attorney, Agent, or Firm* — Fenwick & West LLP

(57) ABSTRACT

An electronic contact lens includes multiple femtoprojectors within the contact lens. Different femtoprojectors project images onto different portions of the retina. The images can be aligned by an alignment circuit within the contact lens. The alignment circuit can adjust the physical position or orientation of one or more femtoprojectors. Additionally, the alignment circuit can configure a location within a femtoprojector array from which an image is projected. A user can provide an input to align the femtoprojectors. For instance, a user can provide an input to adjust a location from which a first femtoprojector projects a test image until the test image is aligned with a test image projected by a second femtoprojector. The alignment circuit can, based on the user's input, determine alignment information for the femtoprojectors, and the contact lens can project subsequent images based on the alignment information.

20 Claims, 6 Drawing Sheets

(56) References Cited

U.S. PATENT DOCUMENTS

| | | |
|---|---|---|
| 5,682,210 A | 10/1997 | Weirich |
| 5,699,193 A | 12/1997 | Monno |
| 5,712,721 A | 1/1998 | Large |
| 5,726,916 A | 3/1998 | Smyth |
| 6,120,460 A | 9/2000 | Abreu |
| 6,215,593 B1 | 4/2001 | Bruce |
| 6,307,945 B1 | 10/2001 | Hall |
| 6,312,393 B1 | 11/2001 | Abreu |
| 6,570,386 B2 | 5/2003 | Goldstein |
| 6,823,171 B1 | 11/2004 | Kaario |
| 6,851,805 B2 | 2/2005 | Blum |
| 6,920,283 B2 | 7/2005 | Goldstein |
| 7,137,952 B2 | 11/2006 | Leonardi |
| 7,359,059 B2 | 4/2008 | Lust |
| 7,626,562 B2 | 12/2009 | Iwasaki |
| 7,758,187 B2 | 7/2010 | Amirparviz |
| 7,835,056 B2 | 11/2010 | Doucet |
| 8,077,245 B2 | 12/2011 | Adamo |
| 8,087,777 B2 | 1/2012 | Rosenthal |
| 8,096,654 B2 | 1/2012 | Amirparviz |
| 8,348,422 B2 | 1/2013 | Pugh |
| 8,348,424 B2 | 1/2013 | Pugh |
| 8,394,660 B2 | 3/2013 | Kim |
| 8,398,239 B2 | 3/2013 | Horning |
| 8,430,310 B1 | 4/2013 | Ho |
| 8,441,731 B2 | 5/2013 | Sprague |
| 8,446,341 B2 | 5/2013 | Amirparviz |
| 8,482,858 B2 | 7/2013 | Sprague |
| 8,520,309 B2 | 8/2013 | Sprague |
| 8,526,879 B2 | 9/2013 | Kristiansen |
| 8,579,434 B2 | 11/2013 | Amirparviz |
| 8,582,209 B1 | 11/2013 | Amirparviz |
| 8,608,310 B2 | 12/2013 | Otis |
| 8,632,182 B2 | 1/2014 | Chen |
| 8,721,074 B2 | 5/2014 | Pugh |
| 8,764,185 B1 | 7/2014 | Biederman |
| 8,781,570 B2 | 7/2014 | Chuang |
| 8,786,520 B2 | 7/2014 | Legerton |
| 8,786,675 B2 | 7/2014 | Deering |
| 8,798,332 B2 | 8/2014 | Otis |
| 8,827,445 B1 | 9/2014 | Wiser |
| 8,830,571 B1 | 9/2014 | Vizgaitis |
| 8,870,370 B1 | 10/2014 | Otis |
| 8,874,182 B2 | 10/2014 | Etzkorn |
| 8,906,088 B2 | 12/2014 | Pugh |
| 8,911,078 B2 | 12/2014 | Meyers |
| 8,922,898 B2 | 12/2014 | Legerton |
| 8,931,906 B2 | 1/2015 | Huang |
| 8,960,898 B1 | 2/2015 | Etzkorn |
| 8,963,268 B2 | 2/2015 | Kim |
| 8,964,298 B2 | 2/2015 | Haddick |
| 8,971,978 B2 | 3/2015 | Ho |
| 8,985,763 B1 | 3/2015 | Etzkorn |
| 8,989,834 B2 | 3/2015 | Ho |
| 9,000,000 B2 | 4/2015 | Carroll |
| 9,028,068 B2 | 5/2015 | Chang |
| 9,039,171 B2 | 5/2015 | Groisman |
| 9,040,923 B2 | 5/2015 | Sprague |
| 9,047,512 B2 | 6/2015 | Otis |
| 9,048,389 B2 | 6/2015 | Fu |
| 9,052,528 B2 | 6/2015 | Pugh |
| 9,052,533 B2 | 6/2015 | Pugh |
| 9,054,079 B2 | 6/2015 | Etzkorn |
| 9,058,053 B2 | 6/2015 | Covington |
| 9,063,351 B1 | 6/2015 | Ho |
| 9,063,352 B2 | 6/2015 | Ford |
| 9,111,473 B1 | 8/2015 | Ho |
| 9,130,099 B2 | 9/2015 | Robin |
| 9,130,122 B2 | 9/2015 | Fu |
| 9,134,546 B2 | 9/2015 | Pugh |
| 9,153,074 B2 | 10/2015 | Zhou |
| 9,158,133 B1 | 10/2015 | Pletcher |
| 9,161,712 B2 | 10/2015 | Etzkorn |
| 9,170,646 B2 | 10/2015 | Toner |
| 9,178,107 B2 | 11/2015 | Tsai |
| 9,192,298 B2 | 11/2015 | Bouwstra |
| 9,195,075 B2 | 11/2015 | Pugh |
| 9,196,094 B2 | 11/2015 | Ur |
| 9,215,293 B2 | 12/2015 | Miller |
| 9,217,881 B2 | 12/2015 | Pugh |
| 9,225,375 B2 | 12/2015 | Pugh |
| 9,244,285 B2 | 1/2016 | Chen |
| 9,271,677 B2 | 3/2016 | Leonardi |
| 9,280,972 B2 | 3/2016 | McCulloch |
| 9,282,920 B2 | 3/2016 | Ho |
| 9,289,123 B2 | 3/2016 | Weibel |
| 9,289,954 B2 | 3/2016 | Linhardt |
| 9,298,002 B2 | 3/2016 | Border |
| 9,298,020 B1 | 3/2016 | Etzkorn |
| D754,861 S | 4/2016 | Etzkorn |
| 9,307,905 B2 | 4/2016 | Varel |
| 9,310,626 B2 | 4/2016 | Pugh |
| 9,316,848 B2 | 4/2016 | Pugh |
| 9,326,710 B1 | 5/2016 | Liu |
| 9,332,935 B2 | 5/2016 | Etzkorn |
| 9,335,562 B2 | 5/2016 | Pugh |
| 9,341,843 B2 | 5/2016 | Border |
| 9,366,872 B2 | 6/2016 | Honea |
| 9,366,881 B2 | 6/2016 | Pugh |
| 9,389,433 B2 | 7/2016 | Pugh |
| 9,401,454 B2 | 7/2016 | Robin |
| 9,414,746 B2 | 8/2016 | Bergman |
| 9,425,359 B2 | 8/2016 | Tsai |
| 9,442,307 B2 | 9/2016 | Meyers |
| 9,445,768 B2 | 9/2016 | Alexander |
| 9,523,865 B2 | 12/2016 | Pletcher |
| 9,639,774 B2 | 5/2017 | Nan |
| 9,728,981 B2 | 8/2017 | Lee |
| 9,884,180 B1 | 2/2018 | Ho |
| 2002/0158816 A1 | 10/2002 | Snider |
| 2006/0290882 A1 | 12/2006 | Meyers |
| 2009/0066722 A1 | 3/2009 | Kriger |
| 2009/0189830 A1* | 7/2009 | Deering ............ G09G 3/02 345/1.3 |
| 2009/0189974 A1* | 7/2009 | Deering ............ G09G 3/02 348/46 |
| 2010/0001926 A1 | 1/2010 | Amirparviz |
| 2010/0234717 A1 | 9/2010 | Wismer |
| 2011/0221659 A1 | 9/2011 | King, III |
| 2012/0153894 A1 | 6/2012 | Widmer |
| 2013/0050432 A1 | 2/2013 | Perez |
| 2013/0100139 A1 | 4/2013 | Schliesser |
| 2013/0242077 A1 | 9/2013 | Lin |
| 2013/0270664 A1 | 10/2013 | Kim |
| 2014/0016097 A1 | 1/2014 | Leonardi |
| 2014/0063054 A1 | 3/2014 | Osterhout |
| 2014/0192311 A1 | 7/2014 | Pletcher |
| 2014/0198128 A1 | 7/2014 | Hong |
| 2014/0240655 A1 | 8/2014 | Pugh |
| 2014/0240665 A1 | 8/2014 | Pugh |
| 2014/0268035 A1* | 9/2014 | Pugh ............ G02C 7/04 351/159.81 |
| 2014/0292620 A1 | 10/2014 | Lapstun |
| 2015/0005604 A1 | 1/2015 | Biederman et al. |
| 2015/0005606 A1 | 1/2015 | Honoré |
| 2015/0016777 A1 | 1/2015 | Abovitz |
| 2015/0049004 A1* | 2/2015 | Deering ............ G02B 27/0172 345/8 |
| 2015/0060904 A1 | 3/2015 | Robin |
| 2015/0062533 A1 | 3/2015 | Toner |
| 2015/0088253 A1 | 3/2015 | Doll |
| 2015/0126845 A1 | 5/2015 | Jin |
| 2015/0145095 A1 | 5/2015 | Kim |
| 2015/0150510 A1 | 6/2015 | Leonardi |
| 2015/0171274 A1 | 6/2015 | Guo |
| 2015/0183173 A1 | 7/2015 | Linhardt |
| 2015/0223684 A1 | 8/2015 | Hinton |
| 2015/0227735 A1 | 8/2015 | Chappell |
| 2015/0234205 A1 | 8/2015 | Schowengerdt |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |

(56) References Cited

U.S. PATENT DOCUMENTS

| | | |
|---|---|---|
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0261294 A1 | 9/2015 | Urbach |
| 2015/0281411 A1 | 10/2015 | Markus |
| 2015/0301338 A1 | 10/2015 | Van Heugten |
| 2015/0312560 A1 | 10/2015 | Deering |
| 2015/0339857 A1 | 11/2015 | O'Connor |
| 2015/0362750 A1 | 12/2015 | Yeager |
| 2015/0362752 A1 | 12/2015 | Linhardt |
| 2015/0380461 A1 | 12/2015 | Robin |
| 2015/0380988 A1 | 12/2015 | Chappell |
| 2016/0005233 A1 | 1/2016 | Fraccaroli |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0030160 A1 | 2/2016 | Markus |
| 2016/0049544 A1 | 2/2016 | Robin |
| 2016/0066825 A1 | 3/2016 | Barrows |
| 2016/0080855 A1 | 3/2016 | Greenberg |
| 2016/0091737 A1 | 3/2016 | Kim |
| 2016/0093666 A1 | 3/2016 | Gilet |
| 2016/0097940 A1 | 4/2016 | Sako |
| 2016/0113760 A1 | 4/2016 | Conrad |
| 2016/0141449 A1 | 5/2016 | Robin |
| 2016/0141469 A1 | 5/2016 | Robin |
| 2016/0143728 A1 | 5/2016 | De Smet |
| 2016/0147301 A1 | 5/2016 | Iwasaki |
| 2016/0154256 A1 | 6/2016 | Yajima |
| 2016/0172536 A1 | 6/2016 | Tsai |
| 2016/0172869 A1 | 6/2016 | Park |
| 2016/0181852 A1 | 6/2016 | Penttila |
| 2016/0204307 A1 | 7/2016 | Robin |
| 2016/0253831 A1 | 9/2016 | Schwarz et al. |
| 2016/0261142 A1 | 9/2016 | Park |
| 2016/0270176 A1 | 9/2016 | Robin |
| 2016/0270187 A1 | 9/2016 | Robin |
| 2016/0276328 A1 | 9/2016 | Robin |
| 2017/0042480 A1 | 2/2017 | Gandhi |
| 2017/0168322 A1 | 6/2017 | Toner |
| 2018/0017813 A1* | 1/2018 | Perozziello ............ G02C 11/10 |
| 2018/0017814 A1* | 1/2018 | Tuan ...................... G02C 11/10 |
| 2018/0136492 A1 | 5/2018 | An |

FOREIGN PATENT DOCUMENTS

| | | |
|---|---|---|
| WO | 2016022665 A1 | 2/2016 |
| WO | 2016141349 | 9/2016 |
| WO | 2016150630 A1 | 9/2016 |

OTHER PUBLICATIONS

Kim, Y-J. et al., "Eyeglasses-Powered, Contact Lens-Like Platform with High Power Transfer Efficiency," Biomed Microdevices, Springer, Jul. 7, 2015, 9 pages.

Pandey, J. et al., "A Fully Integrated RF-Powered Contact Lens with a Single Element Display," IEEE Transactions on Biomedical Circuits and Systems, Dec. 2010, pp. 454-461, vol. 4, No. 6.

* cited by examiner

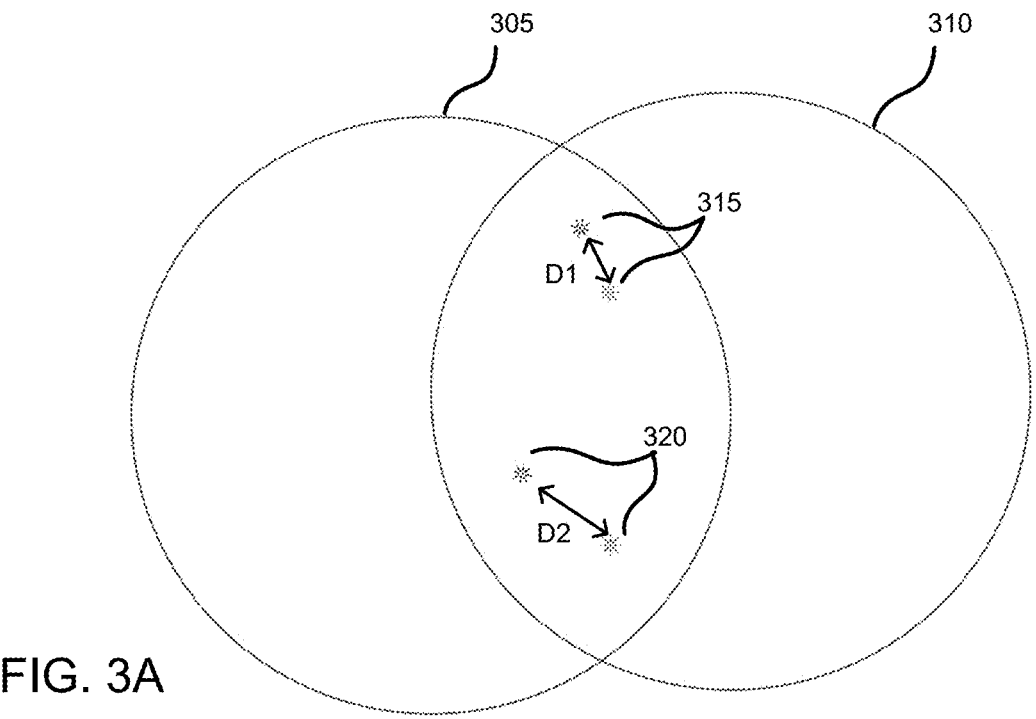
FIG. 3A  two projector image areas, misaligned
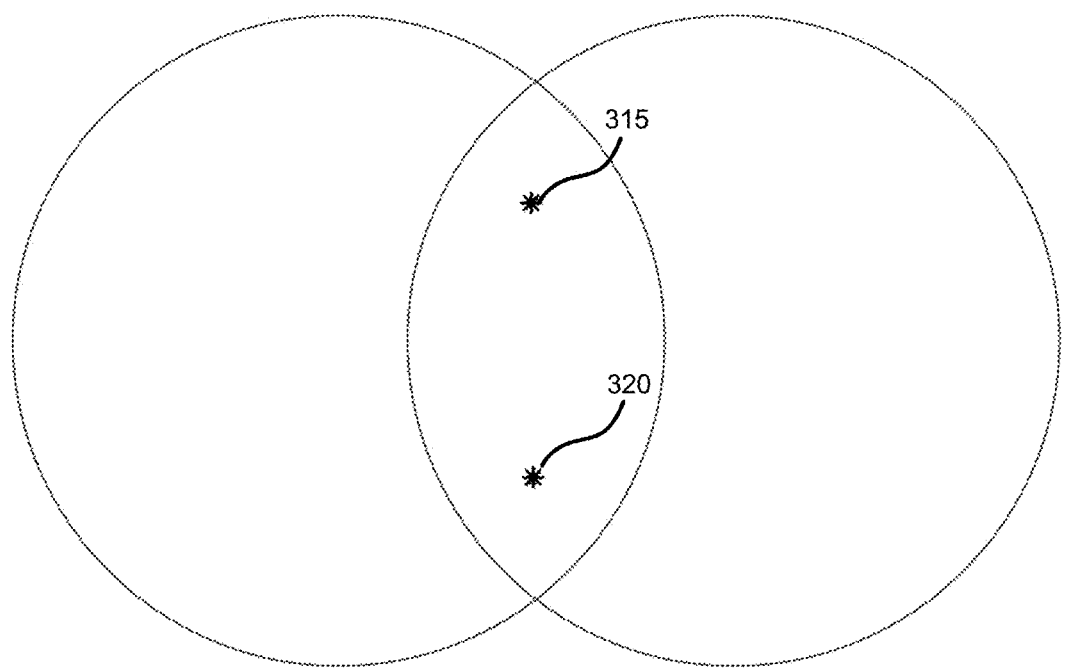
FIG. 3B  two projector image areas, aligned

PROJECTOR ALIGNMENT IN A CONTACT LENS

BACKGROUND

1. Technical Field

This disclosure relates generally to projectors for electronic contact lenses.

2. Description of Related Art

Augmented reality (AR) adds computer-generated information to a person's view of the world around them. One type of AR system includes an electronic contact lens with tiny video projectors (or "femtoprojectors") as described in Deering (U.S. Pat. No. 8,786,675). Multiple projectors can be included within an electronic contact lens, and can each project different portions of the same AR interface. Aligning the projectors within a contact lens can ensure that the AR interface is displayed to a wearer of the contact lens properly.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 3A shows a set of misaligned test images projected onto the retina by a set of femtoprojectors in a contact lens.

FIG. 3B shows a set of aligned test images projected onto the retina by a set of femtoprojectors in a contact lens.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION OF THE PREFERRED EMBODIMENTS

Introduction

A contact lens can include multiple femtoprojectors within the contact lens. Each femtoprojector includes an image source and an optical system that projects images from the image source onto a user's retina. Different femtoprojectors project to different areas of the retina. In one approach, some femtoprojector(s) project images onto the fovea and other femtoprojectors project images onto peripheral regions of the retina. If the images are overlapping, they can be stitched together to create a larger image in the aggregate. For both overlapping and non-overlapping images, alignment of the images is important for proper display.

Images projected by femtoprojectors can be aligned by an alignment circuit within the contact lens. The alignment circuit can adjust the physical position or orientation of one or more femtoprojectors within the contact lens. For example, the alignment circuit can include an electroactive polymer that, when activated, can move a femtoprojector relative to the contact lens. In addition, the alignment circuit can configure a location within a femtoprojector array from which an image is projected. For example, the alignment circuit can provide a reference position within a femtoprojector array, and a femtoprojector can project an image from a position relative to the reference position.

A user can provide an input to the alignment circuit in order to align femtoprojectors. For instance, the user can provide input using one or more of a smart device user interface, a physical input device (e.g., a knob), a voice command, a hand gesture, and an eye gesture. When operating in a calibration mode, femtoprojectors of a contact lens system can project images, such as matching pixels, symbols, or calibration patterns, and a user can provide an input to the alignment circuit in order to adjust the alignment of the femtoprojectors. For instance, a user can provide an input to adjust a location from which a first femtoprojector projects a test image until the test image is aligned with a test image projected by a second femtoprojector. The alignment circuit can, based on the user's input, determine alignment information for the femtoprojectors so that future images projected by the femtoprojectors are projected based on the alignment information.

Electronic Contact Lens Architecture

Figure 1A:
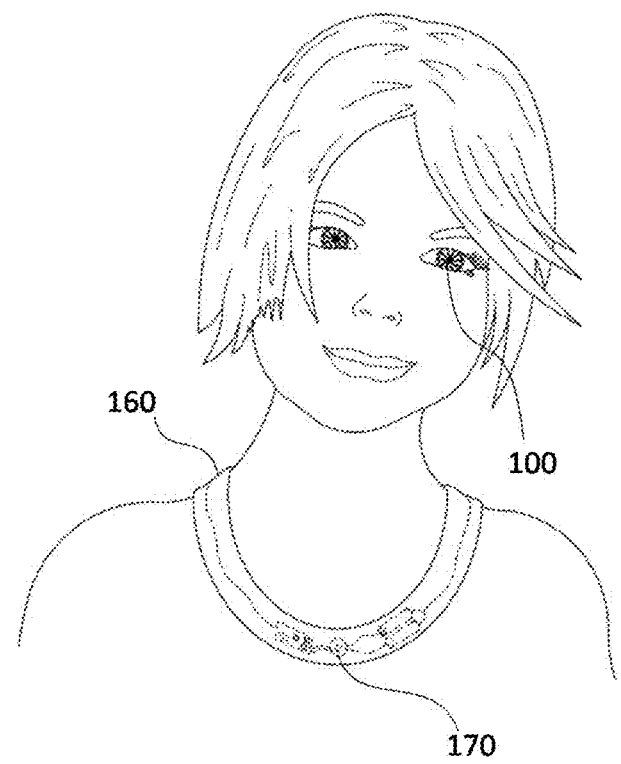
FIG. 1A shows a user wearing an eye-mounted display in communication with an auxiliary necklace.
Figure 1B:
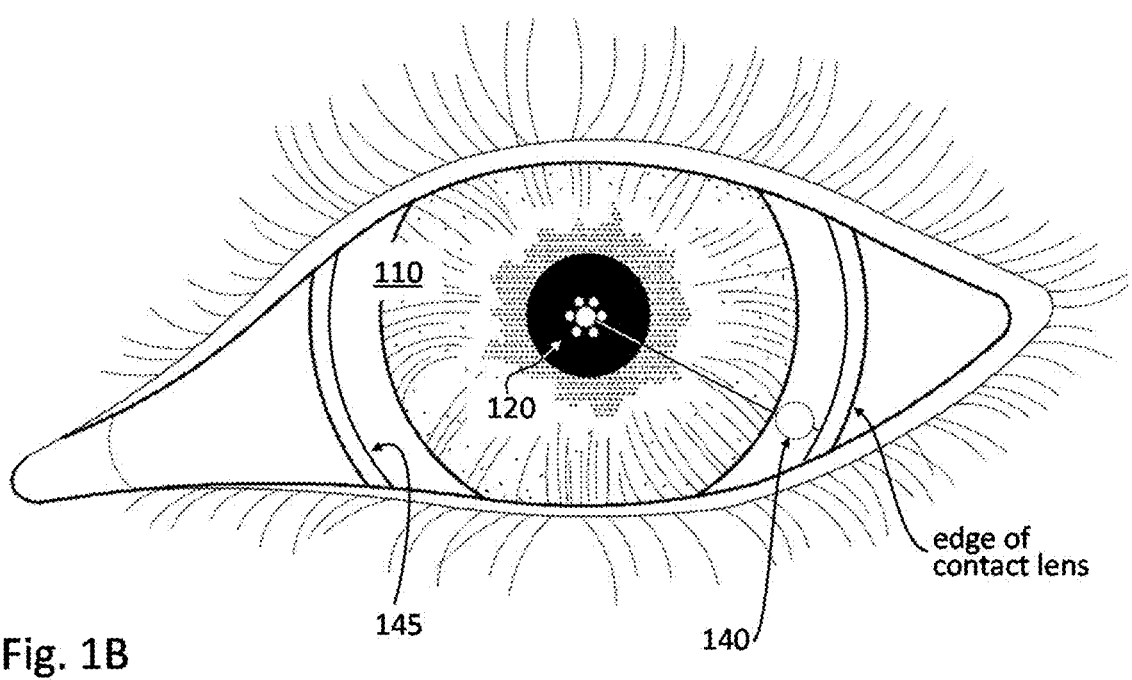
FIG. 1B shows a magnified view of the eye-mounted display mounted on the user's eye.

In more detail, FIG. 1A shows a user wearing an eye-mounted display 100 in communication with a necklace 160 (the user may be referred to as a wearer). FIG. 1B shows a magnified view of the user's eye and eye-mounted display 100. The eye-mounted display 100 includes a contact lens 110 that is worn on the surface of the eye. The following examples use a scleral contact lens but the contact lens does not have to be scleral. The contact lens 110 contains multiple femtoprojectors 120, some of which are central (projecting images on the wearer's fovea) and some of which are peripheral (projecting images adjacent to the image projected by the central projector). In FIG. 1B, the large center circle represents a central femtoprojector, and the six smaller surrounding circles each represent a peripheral femtoprojector. The femtoprojectors 120 project images onto the user's retina.

The contact lens 110 moves with the user's eye 100 as the user's eye rotates in its socket. Because the femtoprojectors 120 are mounted in the contact lens 110, they also move with the user's eye. The central femtoprojector projects images to the fovea, and the peripheral femtoprojectors project images to more peripheral regions which have lower resolutions.

In this example, the contact lens 110 also contains electronics 140 and a coil 145. In some embodiments, the coil 145 is a power coil that receives power wirelessly, for example via magnetic induction. In other embodiments, the contact lens 110 includes a battery that supplies power to the femtoprojectors 120. The electronics 140 may be used to control the femtoprojectors, receive or process data from the femtoprojectors, provide power to the femtoprojectors, transmit data to the femtoprojectors, and/or align femtoprojectors. The contact lens 110 may also include other components.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. Image transmission to an eye-mounted display is subject to data rate constraints due to size and power consumption limitations of electronics in a contact lens.

Figure 2A:
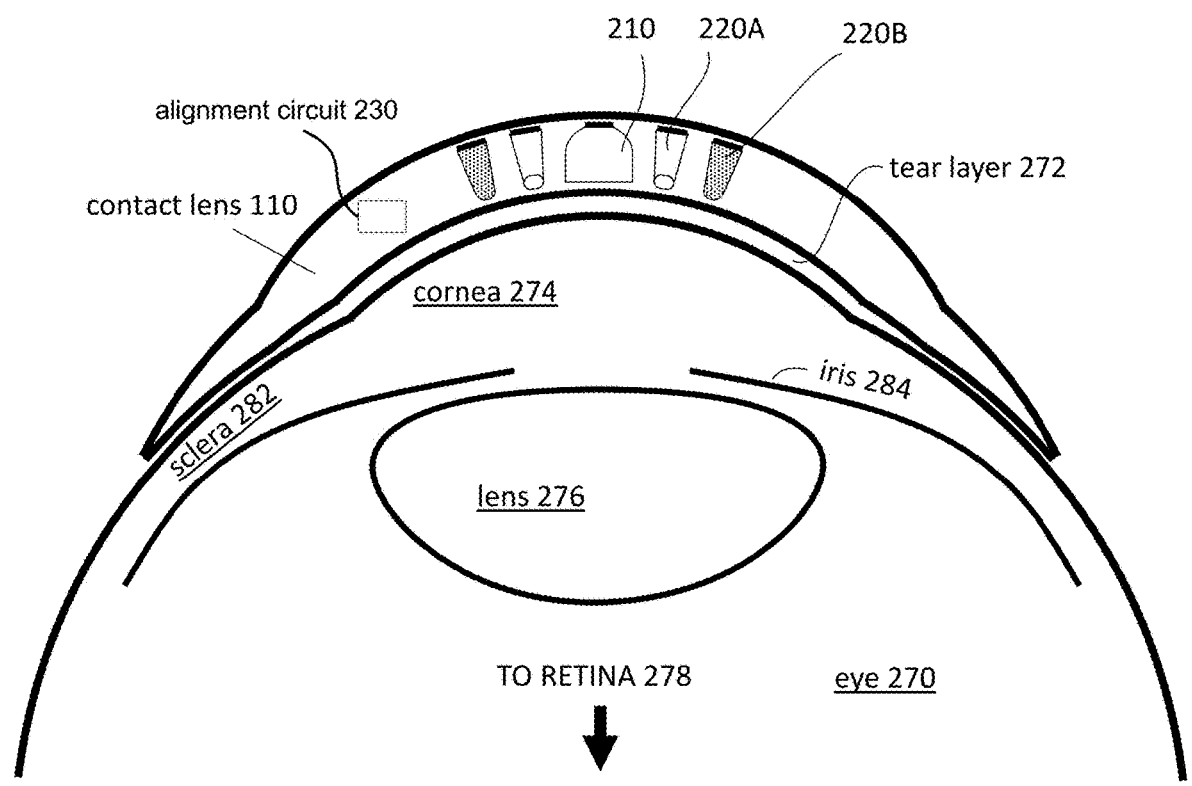
FIG. 2A shows a cross sectional view of an eye-mounted display containing multiple femtoprojectors in a contact lens.

FIG. 2A shows a cross sectional view of an eye-mounted display containing a set of femtoprojectors 210-220 in a scleral contact lens 110. In this example, there are three types of femtoprojectors: a central femtoprojector 210 and two types of peripheral femtoprojectors 220A and 220B. The contact lens 110 is separated from the cornea 274 of the user's eye 270 by a tear layer 272. Over the cornea 274, the tear layer 272 may be as thick as a hundred microns or more while it may be only a few microns thick over the sclera 282. The aqueous of the eyeball is located between the cornea and the crystalline lens 276 of the eye. The vitreous fills most of the eyeball including the volume between the crystalline lens 276 and the retina 278. The iris 284 limits the aperture of the eye.

The contact lens 110 preferably has a thickness that is less than two mm, and the femtoprojectors 210-220 each preferably fits in a 2 mm by 2 mm by 2 mm volume, or less. The contact lens 110 is comfortable to wear and maintains eye health by permitting oxygen to reach the cornea 274.

In addition, the contact lens includes an alignment circuit 230 configured to receive an input from a user and to align the femtoprojectors 210-220 based on the received input. The functionality of the alignment circuit 230 is described below in greater detail.

Figure 2B:
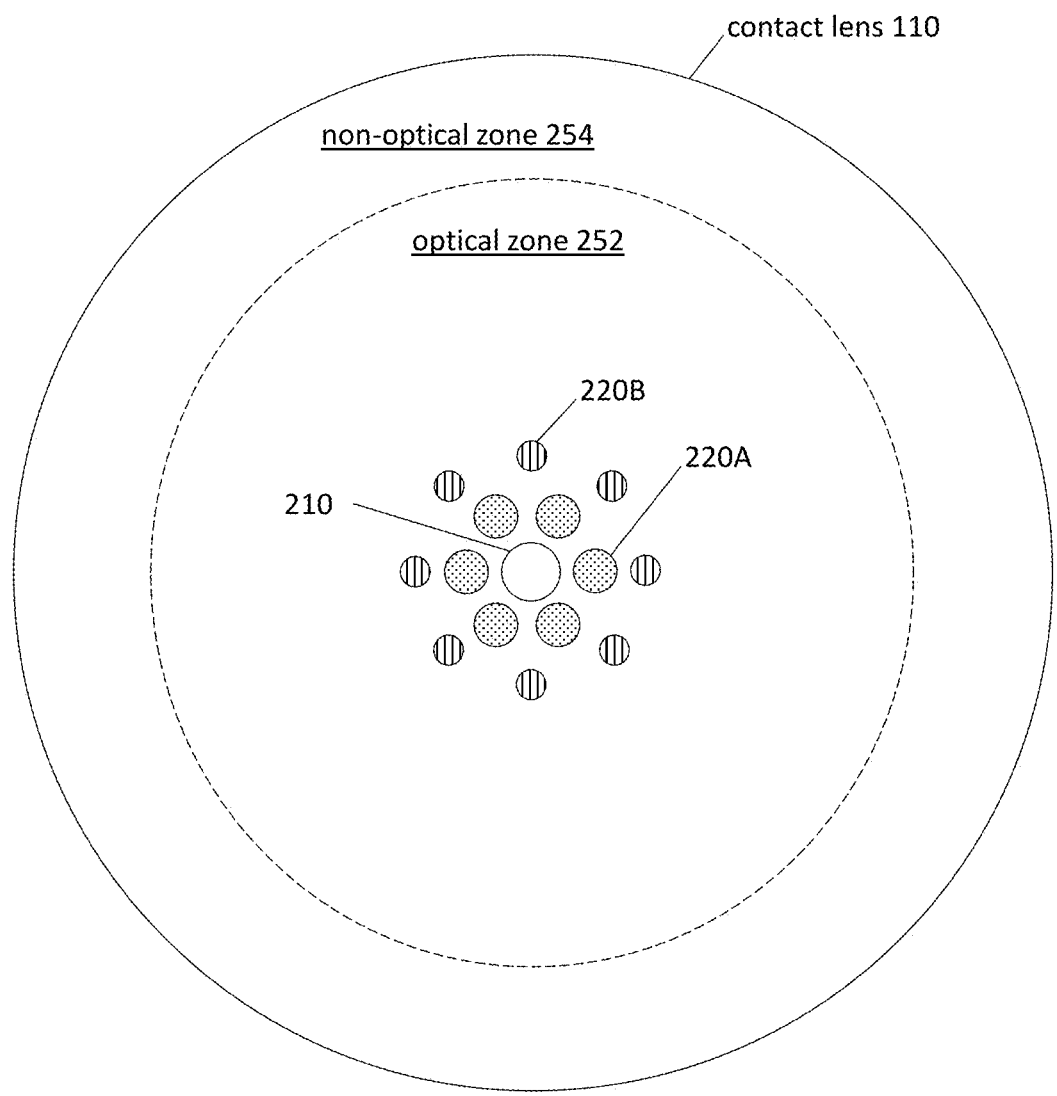
FIG. 2B shows a front view of an eye-mounted display containing multiple femtoprojectors in a contact lens.

FIG. 2B shows a top view of the eye-mounted display with multiple femtoprojectors 210-220 in a contact lens 110. The ratio of the contact lens diameter to femtoprojector lateral size may be 15:1 for the largest femtoprojector. This ratio may be between about 15:1 and 30:1, but may be as small as 5:1 or smaller or as large as 50:1 or larger. FIG. 2B shows three types of femtoprojectors; one central femtoprojector 210, six "zone 1" peripheral femtoprojectors 220A, and eight "zone 2" peripheral femtoprojectors 220B. Eye-mounted displays with 49 or more femtoprojectors arranged in more than two zones in a contact lens are proposed. The femtoprojectors 210-220 in FIG. 2B are also shown as having different sizes.

In FIG. 2B, the contact lens 110 is roughly divided by the dashed circle into an optical zone 252 and a non-optical zone 254. Components in the optical zone 252 may be in the optical path of the eye, depending on how far open the iris is. Components in the non-optical zone 254 fall outside the aperture of the eye. In addition to the femtoprojectors 210-220, the contact lens may also contain other components for data transmission, power, and/or positioning. Data transmission components may include antennae or optical/infrared photodetectors, data storage and buffering, controls, and possibly also on-lens processing. Power components may include coils for power transmission and batteries for power storage. Positioning components may include accelerometers, magnetometers, gyroscopes, and fiducial or other structures used for eye tracking and head tracking.

Figure 2C:
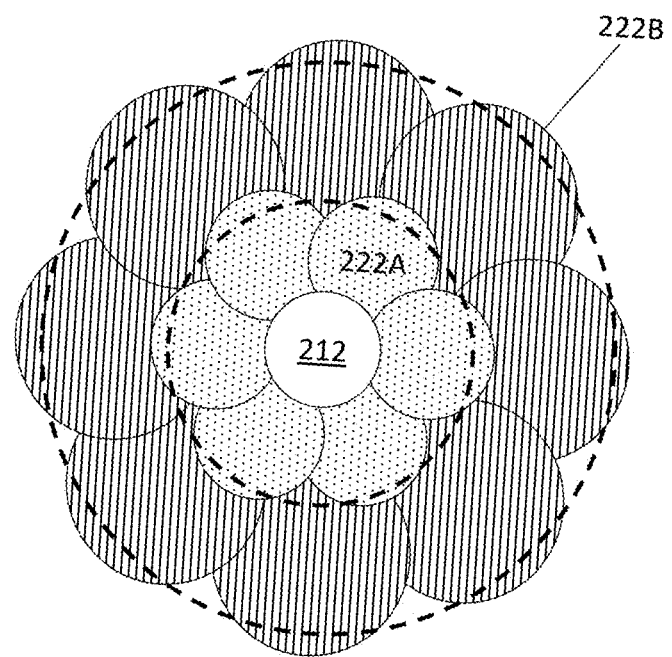
FIG. 2C shows images projected onto the retina by the femtoprojectors of FIGS. 2A and 2B.

FIG. 2C shows the images projected by the femtoprojectors onto the retina. Image 212 is the image projected by central femtoprojector 210. Images 222A are projected by the zone 1 peripheral femtoprojectors 220A. Images 222B are projected by the zone 2 peripheral femtoprojectors 220B. Each group of peripheral femtoprojectors (the zone 1 femtoprojectors and the zone 2 femtoprojectors) project to an approximately annular region shown by the dashed circles.

In addition to the eye-mounted display, the overall system may also include a head tracker, eye tracker and other components. The system receives input images (including possibly video), which are to be displayed to the human user via the eye-mounted display. The femtoprojectors 210-220 project the images on the user's retina, thus creating an image of virtual objects in the user's field of view. Electronics and/or software receive the input images and produce the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace, or other types of packs. FIG. 1A shows an example where some functionality is implemented in a necklace 160 worn by the user.

Projector Alignment

An alignment circuit 230 can align images projected by the femtoprojectors of the contact lens. The alignment circuit 230 may be a standalone circuit, or may be integrated into other contact lens components, such as the femtoprojectors 120. The alignment circuit 230 can align images by laterally or rotationally moving an image relative to one or more other images. In some embodiments, the alignment circuit 230 aligns images such that the images overlap with each other. For instance, overlapping portions of two images projected by two femtoprojectors can be aligned such that the two images appear as one larger image. In other embodiments, the alignment circuit 230 can align images to be adjacent to each other, or to be spaced relative to each other. For instance, multiple femtoprojectors can each project a different and non-overlapping portion of an interface displayed to a user, and the femtoprojectors can be aligned to set a pre-determined spacing between the interface portions.

The alignment circuit 230 can adjust the location on the retina onto which an image is projected by adjusting one or both of the position and orientation of a femtoprojector relative to the contact lens. For example, the alignment circuit 230 can include an electroactive polymer or mechanical arm that, when activated, moves a location of the femtoprojector relative to the contact lens or moves an orientation or angle of the femtoprojector relative to the contact lens. The alignment circuit 230 can also adjust a location within a femtoprojector array from which an image is projected. The femtoprojector array is an area within a femtoprojector comprising multiple locations from which the femtoprojector can project images, such as a pixel grid. For instance, the alignment circuit 230 can provide a reference position within a femtoprojector array, and a femtoprojector can project an image from a position relative to the reference position (for instance, from a portion of the femtoprojector array centered on the reference position).

The alignment circuit 230 can align images based on an input from a wearer. For example, the wearer can provide an input using a smart device user interface, via a physical input device (e.g., a controller or other device), via a voice command, via a hand gesture or eye gesture, or via any other suitable input mechanism. In some embodiments, a user can provide an input moving a first image projected by a first femtoprojector until it is aligned with or adjacent to a second image projected by a second femtoprojector.

The alignment circuit 230 may align images when the contact lens is configured to operate in a calibration mode. The calibration mode may be initiated upon startup of the contact lens, in response to a request from the wearer, after the passage of a threshold period of time since a previous calibration, or in response to any other suitable criteria. When the contact lens is configured to operate in the calibration mode, the femtoprojectors may each project one or more test images to be aligned by the wearer. For example, a test image can include one or more alignment pixels, alignment symbols, or calibration patterns that the user can align via user input. For instance, each femtoprojector can project the same image, and the user can align the images until they appear as a single image. In another example, test images comprise different portions of a larger image that the user can align to form one larger image.

After the wearer aligns the test images, alignment information representative of the alignment can be stored by the contact lens. For instance, the alignment information can describe, for each femtoprojector, the location and/or orientation of the femtoprojector relative to the contact lens, the location within the femtoprojector array from which the aligned test image was projected, and the like. After the femtoprojectors are aligned, the contact lens can be configured to operate in a normal operating mode (for instance, in response to an input from the wearer indicating that the alignment or calibration is complete). During operation in the normal operating mode, the contact lens can configure the femtoprojectors to project images based on the alignment information. For instance, images can be projected from femtoprojectors at locations and orientations relative to the contact lens described by the alignment information.

FIGS. 3A and 3B show test images projected onto the retina by a set of femtoprojectors in a contact lens. The test images include image 305 and image 310. Each test image includes a first alignment symbol 315 and a second alignment symbol 320 viewable by the wearer. In the example of FIG. 3A, the corresponding alignment symbols 315 are misaligned relative to each other by distance D1, and the corresponding alignment symbols 320 are misaligned relative to each other by distance D2.

The distances D1 between the alignment symbols 315 and D2 between the alignment symbols 320 can be reduced or eliminated by changing the locations on the retina onto which the images 305 and 310 are projected, and by rotating a first image relative to a second image. For instance, a user can provide an input requesting the image 310 be moved closer to the image 305 and rotated counterclockwise relative to the image 305. In the example of FIG. 3B, the images 305 and 310 have been calibrated based on a user's input such that the alignment symbols 315 and the alignment symbols 320 each appear as a single alignment symbol.

Figure 4A:
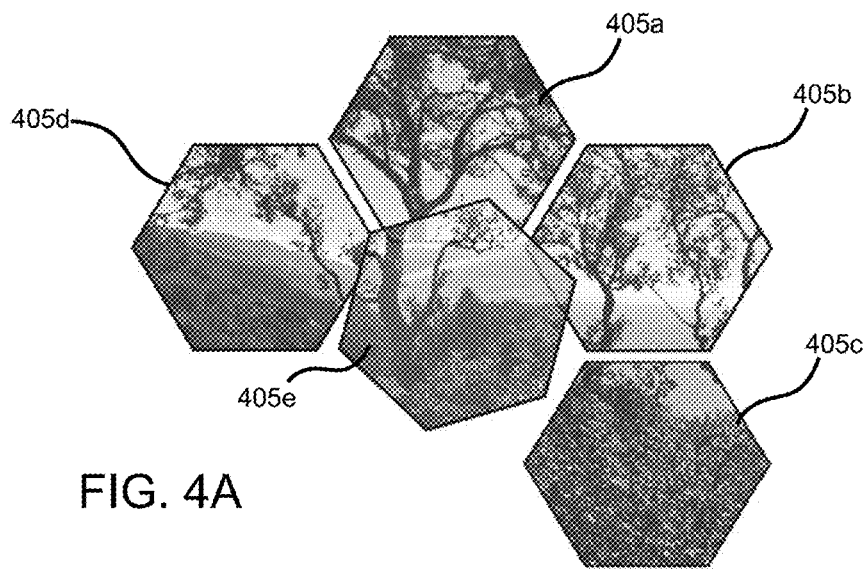
FIG. 4A shows a rotationally misaligned test image in a set of laterally misaligned test images projected onto the retina by a set of femtoprojectors in a contact lens.
Figure 4B:
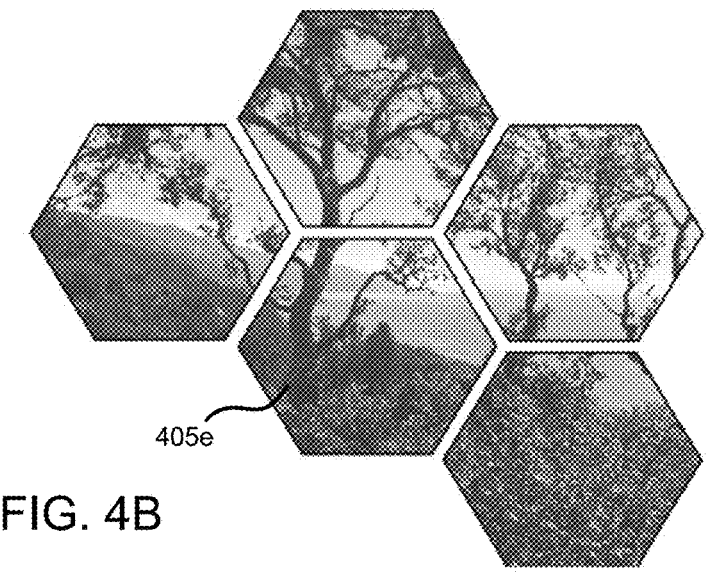
FIG. 4B shows an image formed from tiled sub-images with blank spaces between the sub-images projected onto the retina by a set of femtoprojectors in a contact lens.
Figure 4C:
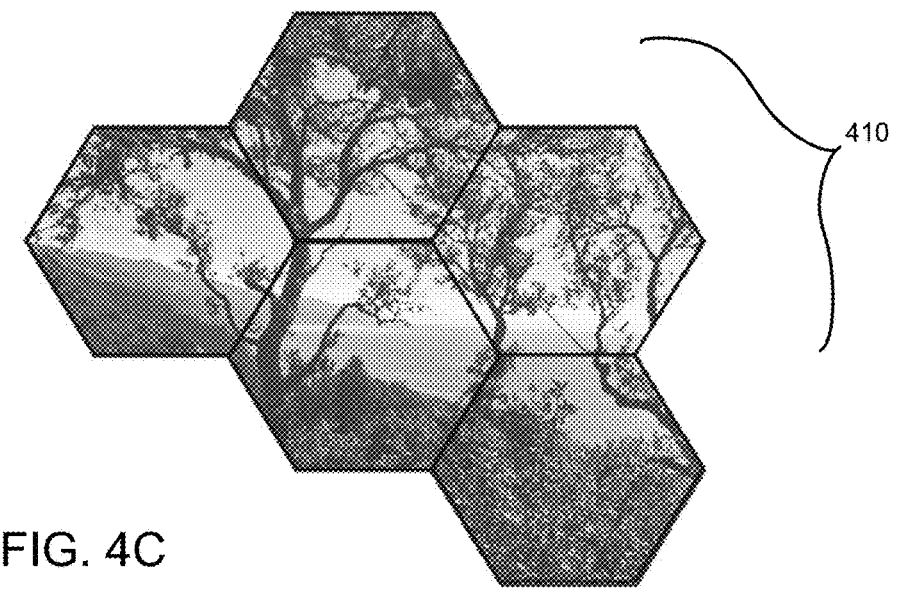
FIG. 4C shows a set of aligned test images projected onto the retina by a set of femtoprojectors.

FIGS. 4A-4C show a set of test images projected by a set of femtoprojectors within a contact lens. The images 405a-e are each hexagonal portions of a larger image, and are each projected by a different femtoprojector. If the femtoprojectors are properly aligned, the images 405 appear as the single larger image 410 (as opposed to hexagonal portions of the image). Although the images 405 are hexagonal, it should be appreciated that in practice, the test images may be any shape or size.

In the example of FIG. 4A, the test images 405 are laterally misaligned relative to each other, and additionally, the test image 405e is rotationally misaligned relative to the other test images. A wearer can provide an input requesting that the test image 405e be rotated clockwise relative to the other test images. In response, the alignment circuit 230 can rotate the femtoprojector projecting the test image 405e until it is no longer rotationally misaligned with the other test images as illustrated in the example of FIG. 4B.

The wearer can then provide inputs requesting that each of the test images 405a-d be moved closer to test image 405e, and the alignment circuit 230 can adjust a position within each femtoprojector array from which each of the test images 405a-d are projected until they are adjacent to the test image 405e. The example of FIG. 4C shows the test images 405 aligned to form a single larger image 410. Although the test images 405 of FIGS. 4A-4C are intended to be displayed as a single larger image, in practice, some gaps between the test images may be preferred or intentional (for instance, as separate elements within an AR interface displayed by the femtoprojectors). In such instances, a wearer can align the test images 405 by positioning the test images relative to each other at desired spacing.

Although the detailed description contains many specifics, these should not be construed as limiting the scope of the invention but merely as illustrating different examples. It should be appreciated that the scope of the disclosure includes other embodiments not discussed in detail above. For example, the core may be other shapes, such as cylindrical or using polygon bases. Various other modifications, changes, and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

What is claimed is:

1. A contact lens comprising:
   a contact lens body;
   a first femtoprojector embedded within the contact lens body and configured to project a first image onto a retina of a wearer of the contact lens;
   a second femtoprojector embedded within the contact lens body and configured to project a second image onto the retina of the wearer of the contact lens; and
   an alignment circuit configured to align the first femtoprojector and the second femtoprojector based on an input from the wearer of the contact lens.

2. The contact lens of claim 1, wherein the first image and the second image are the same.

3. The contact lens of claim 2, wherein the input from the wearer of the contact lens comprises an input to align the first image and the second image.

4. The contact lens of claim 2, wherein the first image and the second image comprise one or more of: a pixel, a symbol, and a calibration pattern.

5. The contact lens of claim 1, wherein the first image and the second image comprise different images.

6. The contact lens of claim 5, wherein the input from the wearer comprises an input to align the first image to be adjacent to the second image.

7. The contact lens of claim 1, wherein the first image and the second image comprise different portions of a same image.

8. The contact lens of claim 1, wherein the alignment circuit is configured to align the first femtoprojector and the second femtoprojector by adjusting an orientation of the first femtoprojector and/or the second femtoprojector relative to the contact lens body.

9. The contact lens of claim 1, wherein the alignment circuit is configured to align the first femtoprojector and the second femtoprojector by adjusting a portion of a first array of the first femtoprojector from which the first image is projected and/or a portion of a second array of the second femtoprojector from which the second image is projected.

10. The contact lens of claim 1, wherein the input from the wearer is received via a device of the wearer.

11. The contact lens of claim 1, wherein the input from the wearer comprises a voice command.

12. The contact lens of claim 1, wherein the input from the wearer comprises a hand gesture.

13. The contact lens of claim 1, wherein the input from the wearer comprises an eye gesture.

14. The contact lens of claim 1, wherein the alignment circuit is configured to align the first femtoprojector and the second femtoprojector when the contact lens is operating in a calibration mode.

15. The contact lens of claim 1, wherein the alignment circuit is configured to align the first femtoprojector and the second femtoprojector in response to a request for alignment from the wearer of the contact lens.

16. The contact lens of claim 1, wherein the alignment circuit is configured to align the first femtoprojector and the second femtoprojector upon startup of the contact lens.

17. The contact lens of claim 1, wherein the alignment circuit is configured to align the first femtoprojector and the second femtoprojector after the passage of a pre-determined period of time since a previous alignment.

18. A method for calibrating an electronic contact lens comprising:
   projecting, by a first femtoprojector embedded within the electronic contact lens, a first image onto a retina of a wearer of the electronic contact lens;
   projecting, by a second femtoprojector embedded within the electronic contact lens, a second image onto the retina of the wearer of the electronic contact lens;
   receiving, from the wearer of the electronic contact lens, an input based on the first image and the second image; and
   aligning, by the electronic contact lens, the first femtoprojector and the second femtoprojector based on the received input.

19. The method of claim 18, wherein the aligning the first femtoprojector and the second femtoprojector comprises adjusting an orientation of the first femtoprojector and/or the second femtoprojector relative to the electronic contact lens.

20. The method of claim 18, wherein the aligning the first femtoprojector and the second femtoprojector comprises adjusting a portion of a first array of the first femtoprojector from which the first image is projected and/or a portion of a second array of the second femtoprojector from which the second image is projected.

* * * * *